(12) United States Patent
Togo

(10) Patent No.: US 8,064,523 B2
(45) Date of Patent: Nov. 22, 2011

(54) MOTION VECTOR SEARCH APPARATUS

(75) Inventor: Kiyotake Togo, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1196 days.

(21) Appl. No.: 11/762,241

(22) Filed: Jun. 13, 2007

(65) Prior Publication Data

US 2008/0056368 A1      Mar. 6, 2008

(30) Foreign Application Priority Data

Aug. 30, 2006    (JP) .................... 2006-234299

(51) Int. Cl.
*H04N 7/12* (2006.01)
*G06K 9/36* (2006.01)

(52) U.S. Cl. ......... 375/240.16; 375/240.12; 375/240.13; 375/240.14; 375/240.15; 382/232

(58) Field of Classification Search .............. 375/240.16
See application file for complete search history.

(56) References Cited

U.S. PATENT DOCUMENTS

| 7,792,193 | B2 * | 9/2010 | Tanizawa et al. | ........ 375/240.16 |
| 2003/0174775 | A1 * | 9/2003 | Nagaya et al. | ........... 375/240.12 |

FOREIGN PATENT DOCUMENTS

| JP | 10-042300 | 2/1998 |
| JP | 10-336671 | 12/1998 |
| JP | 2003-087799 | 3/2003 |
| JP | 2004-356673 | 12/2004 |

OTHER PUBLICATIONS

Nakayama et al., "Tei shohi denryoku MPEG-4 bideo kodekkku koa" (A low-power MPEG-4 video codec core), Fujitsu, 55[6] (Nov. 2004), pp. 528-533.

* cited by examiner

*Primary Examiner* — Longbit Chai
(74) *Attorney, Agent, or Firm* — Volentine & Whitt, PLLC

(57) ABSTRACT

A motion vector search apparatus has two internal memories for storing one macroblock of current image data each and N internal memories for storing M macroblocks of reference image data each, where M and N are integers greater than one. Selectors feed data from one of the current image memories and N−1 of the reference image memories to a processor that carries out a block matching calculation, on the basis of which a detector finds a motion vector for the selected macroblock of current image data. During the search, data for one new current image macroblock and M new reference image macroblocks are read into the non-selected memories, so that as soon as the motion vector is found, the search for the next motion vector can begin.

18 Claims, 6 Drawing Sheets

MOTION VECTOR SEARCH APPARATUS

BACKGROUND OF THE INVENTION

1. Field of the Invention

The present invention relates to a method and apparatus for finding motion vectors in, for example, a video codec conforming to the MPEG-4 standard developed by the Moving Picture Experts Group.

2. Description of the Related Art

Searching for motion vectors is a way to code part of a moving picture efficiently by finding a closely resembling part of a reference picture. Motion vector search techniques for MPEG-4 are described in, for example, Japanese Patent Application Publication (JP) No. 10-42300, No. 10-336671, No. 2003-87799, and No. 2004-356673, and by Nakayama et al. in "Tei shohi denryoku MPEG-4 bideo kodekku koa" (A low-power MPEG-4 video codec core), Fujitsu, 55[6] (2004-11), pp. 528-533.

Examples of known vector search methods include full search, three step search (TSS), new three step search (NTSS), sampling, and adaptive motion vector search methods. Descriptions can be found in JP 2003-87799.

All of these methods search for motion vectors within a limited range known as a search window by matching a macroblock in the current frame against different reference blocks in a reference frame. A frame is a unit of moving picture data representing one picture. A macroblock is a rectangular area within a frame, measuring 16×16 pixels in the MPEG standards. The reference block is a block of the same size as the macroblock but located at an arbitrary position, referred to as a search point. The block matching calculation is typically a summation of absolute differences (SAD) between the values of corresponding luminance picture elements (pixels).

The full search method performs block matching calculations for all search points in the search window, selects the reference block that best matches the macroblock in the current frame, and takes the relative position of this reference block as the motion vector of the macroblock. By always finding the best match within the search window, the full search produces the best picture quality, but a full search requires a prodigious amount of computation for each motion vector and for that reason is impractical in real-time systems.

The TSS, NTSS, and sampling methods were proposed in order to reduce the amount of computation. All of these methods use search patterns that examine a fixed number of reference blocks in the search window. Although the fixed number is less than the full number, since the same number of block matching calculations are done even when there is little or no motion, much of the computation turns out to have been unnecessary.

Figure 1:
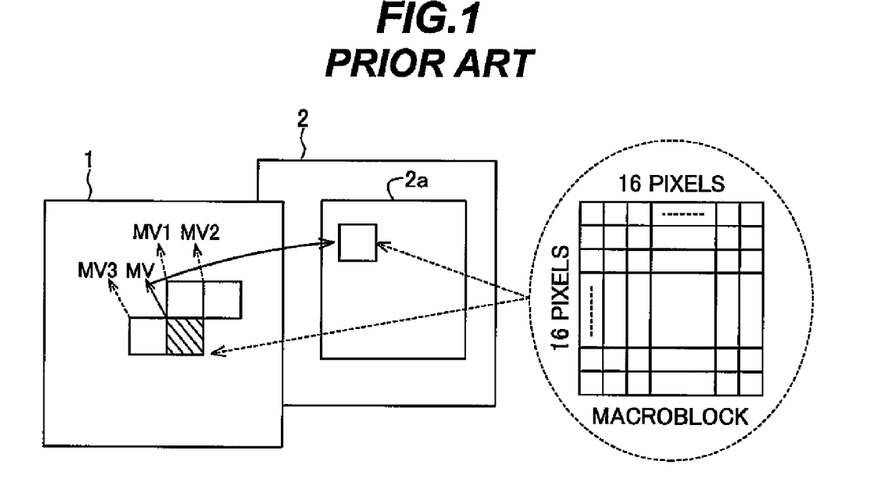
FIGS. 1, 2, and 3 illustrate a known adaptive motion vector search algorithm.
Figure 2:
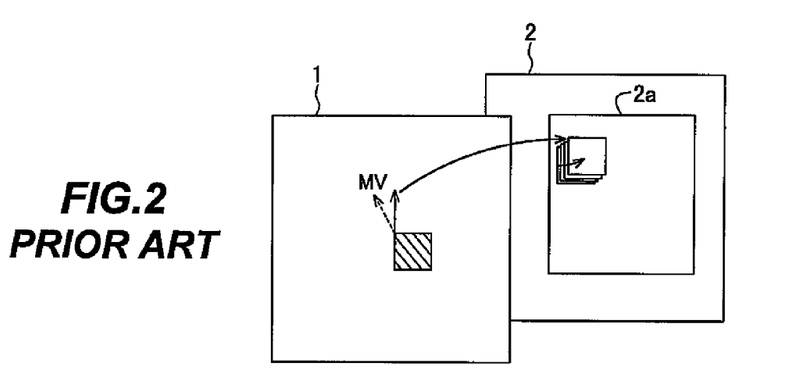
Figure 3:
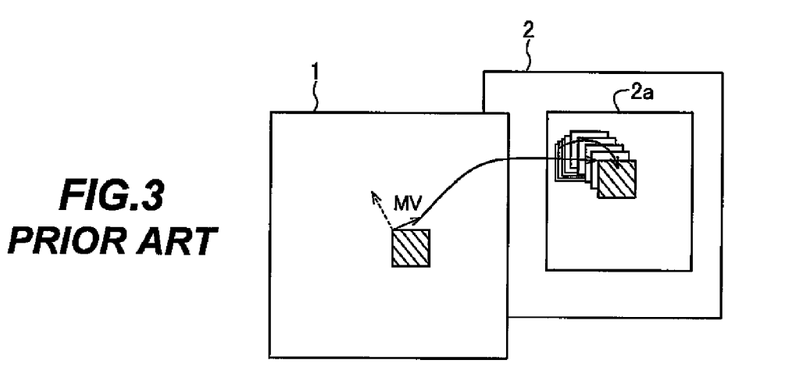

To overcome this problem, adaptive motion vector search methods examine a non-fixed number of reference blocks. One adaptive motion vector search technique is described in the Nakayama et al. reference and in JP 2003-087799. As illustrated in FIGS. 1 to 3, this algorithm has three steps.

In the first step (FIG. 1), the motion vectors MV1, MV2, MV3 of nearby macroblocks that have already been processed in the current frame 1 are used to select an initial central search point (MV) in the search window 2a in the reference frame 2, and its block matching value is calculated.

In the second step (FIG. 2), block matching values are calculated for four search points displaced by one pixel in the up, down, left, and right directions from the central search point, and if any of these four search points yields a better match than the central search point, the search point with the best of the four block matching values is taken as a new central search point.

In the third step (FIG. 3), the second step is repeated until the central search point has a better block matching value than any of the four surrounding points. The central search point is then taken as the motion vector.

Figure 4:
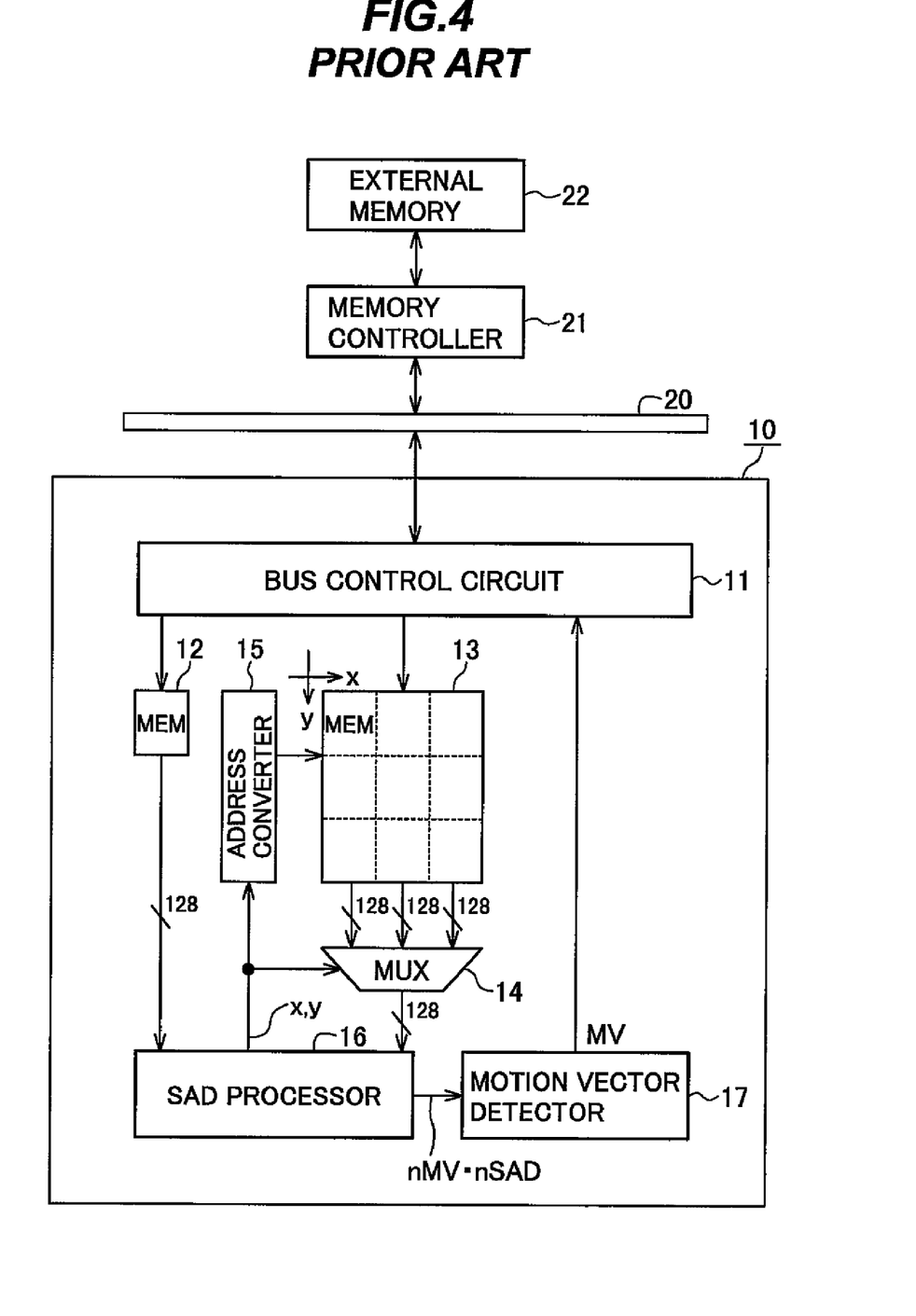
FIG. 4 is a block diagram of a conventional motion vector search apparatus.

FIG. 4 shows an example of a conventional motion vector search apparatus for an MPEG-4 encoder described in JP 2003-87799 and JP 2004-356673. The motion vector search apparatus 10 comprises a bus control circuit 11, a current image memory (MEM) 12, a reference image memory 13, a multiplexer (MUX) 14, an address converter 15, a SAD processor 16, and a motion vector detector 17. The current image memory 12 stores image data for one macroblock, for which a motion vector is to be found; the amount of data stored is eight bits for each of the 16×16 pixels in the macroblock. The reference image memory 13 stores nine macroblocks of image data from the reference frame. The bus control circuit 11 is linked by a bus 20 to a memory controller 21, which controls a large external memory 22 that stores image data. The bus 20 is also connected to other circuits (not shown) in the MPEG-4 encoder.

With the conventional apparatus in FIG. 4, the motion vector search is carried out by the following six processes:

Process 1: Under the control of the bus control circuit 11 and memory controller 21, one macroblock of image data for the current frame (t) is read from the external memory 22 and stored in the current image memory 12.

Process 2: Under the control of the bus control circuit 11 and memory controller 21, nine macroblocks of image data for the preceding frame (t−1) are read from the external memory 22 and stored in the reference image memory 13. The nine macroblocks include the macroblock in the same position as the macroblock read in process 1 and its eight neighboring macroblocks.

Process 3: The SAD processor 16 computes a SAD value comparing the macroblock stored in the current image memory 12 with a block of reference data at a search point selected by the search algorithm. The block of data in the reference image memory 13 is specified by address coordinates (x, y). The address converter 15 converts these coordinates to a series of addresses in the reference image memory 13, and the multiplexer 14 supplies the data read from these addresses to the SAD processor 16. The data are read a line at a time, where a line includes data for sixteen pixels. After sixteen lines have been read, the calculation is completed, and the resulting SAD value (nSAD) and the vector (nMV) identifying the position of the block in the reference image memory 13 are sent to the motion vector detector 17.

Process 4: Process 3 is executed repeatedly according to the adaptive search algorithm.

Process 5: When the search ends, the motion vector detector 17 stores the motion vector MV it has found in the external memory 22 via the bus control circuit 11 and memory controller 21.

Process 6: New current image data and reference image data are stored in memories 12 and 13 and processes 3 to 5 are repeated to detect motion vectors for the next macroblock. This process continues until motion vectors have been found for every macroblock in one frame (one screen). For a video graphics array (VGA) frame, for example, which has 640× 480 pixels, this involves finding motion vectors for 40×30 macroblocks.

A problem with the conventional motion vector search method and the apparatus shown in FIG. 4 is that the search for each motion vector cannot start until new image data have been transferred from the external memory 22 into the current image memory 12 and reference image memory 13 over the bus 20. As a result, when the bus 20 is crowded because of access by other circuits (not shown), or when a large amount of data has to be transferred because the image is large, it may be impossible to complete the motion vector search in the necessary time. This may force the encoder to use a poorly matching reference block, which adversely affects the quality of the encoded image.

A solution to this problem proposed in JP 2004-356673 interconnects the current image memory 12, reference image memory 13, SAD processor 16, and motion vector detector 17 with an internal data bus, and provides an internal memory controller to control data transfers on the internal data bus. A program controller that programs the internal memory controller and other parts of the apparatus is also provided. The internal memory controller and program controller are linked to the internal data bus. The program controller uses the internal bus controller to transfer macroblocks of data from the current image memory 12 to the reference image memory 13. The SAD processor 16 is programmed to use the current image data transferred into the reference image memory 13 to carry out the SAD calculation. The internal bus controller and the SAD processor 16 operate concurrently.

By allowing the SAD calculations to proceed in parallel with data transfers, this scheme is held to speed up the motion vector search process, but since it requires an additional internal data bus, internal memory controller, and program controller, it leads to a motion vector search apparatus that is large in size and requires a complex control program.

SUMMARY OF THE INVENTION

An object of the present invention is to provide a method and apparatus for efficiently finding motion vectors without internal transfer of image data.

The invention provides a motion vector search apparatus that includes a pair of current image memories each capable of storing one macroblock of current image data and N reference image memories each capable of storing M macroblocks of reference image data, where N and M are integers greater than one. In one preferred configuration, M is three and N is four.

A first selector selects data read from one of the two current image memories. A second selector selects data read from at least one of the reference image memories. A processor calculates block matching values such as summations of absolute differences between the data selected by the first selector and the data selected by the second selector. A detector uses the block matching values to find a motion vector for the macroblock selected by the first selector.

This motion vector search apparatus is used to find motion vectors for macroblocks as follows.

To start the search, one macroblock of current image data is read from an external memory into one of the two current image memories, and (N−1)×M macroblocks of reference image data are read into (N−1) of the reference image memories, leaving one current image memory and one reference image memory unoccupied. The (N−1)×M macroblocks of reference image data preferably include the macroblocks in the same positions as the one macroblock of current image data and its immediately adjacent macroblocks.

Next the selectors select the occupied memories and the processor and detector conduct a search according to a predetermined search algorithm to find a motion vector for the macroblock stored in the occupied current image memory. During the search process, the next macroblock of current image data is read into the unoccupied current image memory and the next M macroblocks of reference image data are read into the unoccupied reference image memory. At the end of the search, the detector stores a motion vector for the current macroblock in the external memory.

The first and second selectors then switch their memory selections and the processor and detector conduct a new search to find a motion vector for the next macroblock, using the data already stored in the memories. During this search a new macroblock of current image data is read into the non-selected current image memory, and M macroblocks of new reference image data are read into a non-selected one of the reference image memories. At the end of the search, the detector stores another motion vector in the external memory.

The process continues in this way, the new image data required to find a motion vector for each successive macroblock being read while the motion vector search for the preceding macroblock is being carried out, until the motion vectors needed for an entire frame have been found. The two current image memories are selected alternately, and the reference image memories are selected cyclically.

At the edges of the image, the number of new macroblocks of reference image data may be greater than or less than M; the procedure for reading new data into the reference image memories may be varied appropriately at these points.

The above process is efficient because most of the reading of macroblock data from the external memory takes place while the block matching calculations are being carried out. When the processor and detector find one motion vector, they can begin the next motion vector search immediately, without having to wait for more data to be read into the memories.

No macroblock data are transferred between the current image memories and reference image memories. Accordingly, no internal data bus or internal memory controller is needed and no elaborate control program is needed to control inter-memory transfers.

For further efficiency, the reference image memories may be multi-port memories with two read ports, the processor may include two independent processor units, and the second selector may include a third selector connected to one of the read ports and a fourth selector connected to the other read port of each reference image memory. One processor unit operates on the data selected by the first and third selectors while the other processor unit operates concurrently on the data selected by the first and fourth selectors, thereby speeding up the block matching calculations by a factor of two.

The detector may include an internal register file for storing the motion vectors that it finds, and may select the starting point for the motion vector search for each macroblock on the basis of stored motion vectors already found for adjacent macroblocks.

Alternatively, the reference image memories may include space for storing motion vectors and may have two write ports each, one for receiving reference image data from the external memory and another connected to the detector. The detector stores motion vectors in the reference image memories instead of a register file. As memory cells are smaller than register cells, this scheme saves space.

DETAILED DESCRIPTION OF THE INVENTION

Embodiments of the invention will now be described with reference to the attached drawings, in which like elements are indicated by like reference characters.

The motion vector search apparatus in each of the embodiments is structured as a module for use in, for example, an MPEG-4 encoder. The parameter M is three and N is four. The processor is a specialized SAD arithmetic unit, or a pair of such units. The selectors comprise multiplexers connected to the memories and the SAD arithmetic unit or units by 128-bit data paths, allowing each multiplexer to transfer luminance data for sixteen pixels at a time.

First Embodiment

Figure 5:
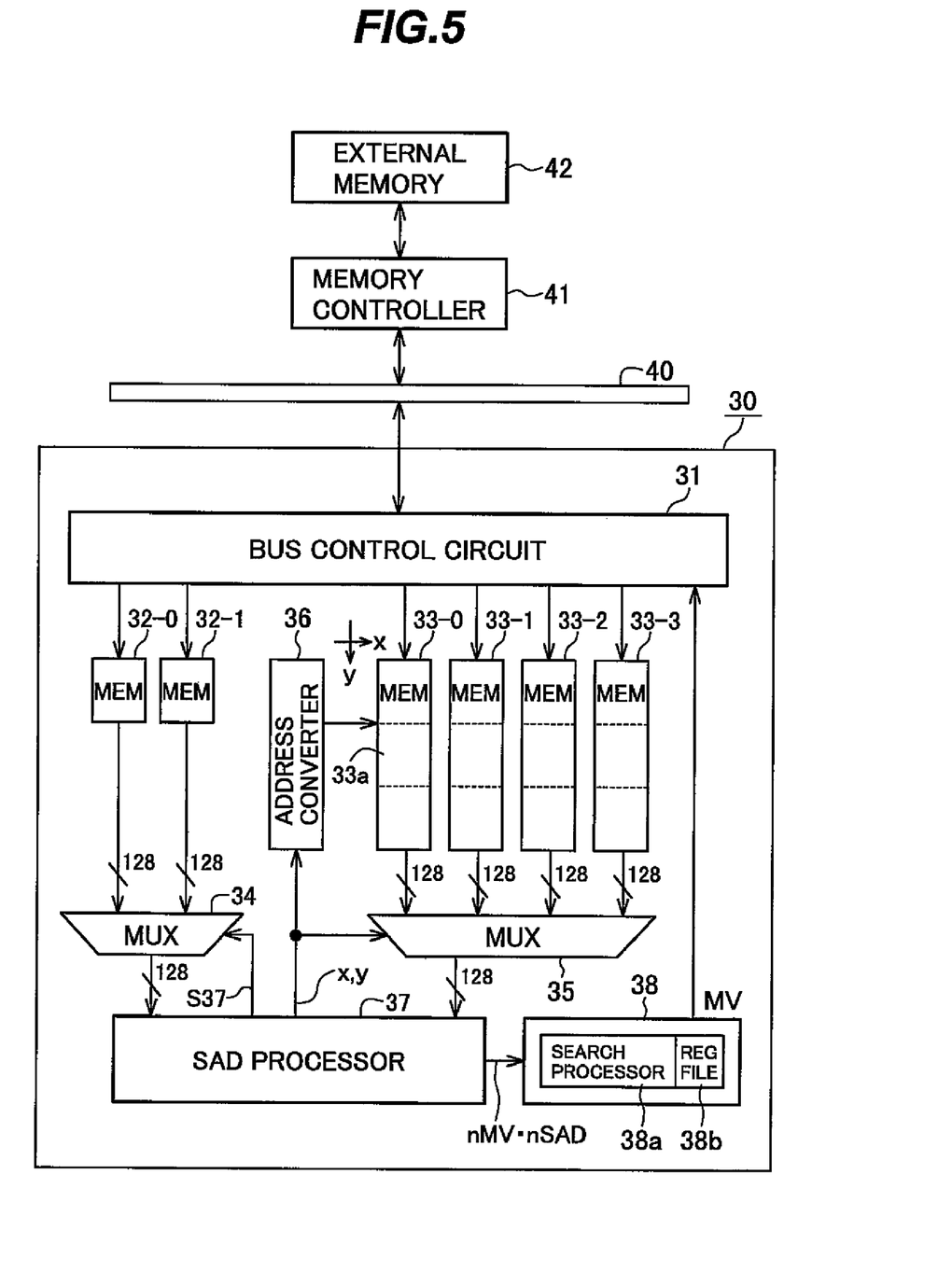
FIG. 5 is a block diagram schematically showing the structure of a motion vector search apparatus illustrating a first embodiment of the invention.

Referring to FIG. 5, the motion vector search apparatus 30 in the first embodiment has a bus control circuit 31 connected to first and second current image memories 32-0 and 32-1 and first to fourth reference image memories 33-0 to 33-3. The first and second current image memories 32-0 and 32-1 are organized as two memory banks, each with storage space for just one macroblock of image data. The first to fourth reference image memories 33-0 to 33-3 are organized as four (N) memory banks, each with storage space 33a for three (M) macroblocks of image data. A macroblock includes 256 luminance pixel values, each represented by one byte (8 bits) of data.

Each of these memories 32-0, 32-1, and 33-0 to 33-3 is a single-port memory such as a random access memory (RAM) with a 128-bit-wide data output path and a separate data input path, which may have a smaller bit width. The two paths are not used simultaneously; any particular memory is capable, at any given time, of either read access (output) or write access (input) but not both types of access. The two current image memory banks 32-0, 32-1 are used for storing image data from the current frame. The four reference image memory banks 33-0 to 33-3 are used for storing image data from the frame one frame before the current frame.

The output data paths from the current image memory banks 32-0 and 32-1 lead to a first selector or multiplexer (MUX) 34, which has two 128-bit input ports and one 128-bit output port. The output data paths from the reference image memory banks 33-0 to 33-3 lead to a second multiplexer 35, which has four 128-bit input ports and one 128-bit output port. The output ports of the multiplexers 34, 35 are connected to a SAD processor 37. The SAD processor 37 outputs a switching signal S37 to multiplexer 34, outputs address coordinates (x, y) designating a search point to multiplexer 35 and an address converter 36, and outputs data to a motion vector detector 38.

The switching signal S37 received from the SAD processor 37 instructs multiplexer 34 to select data from one of the current image memory banks 32-0, 32-1. The address converter 36 converts the address coordinates (x, y) supplied by the SAD processor 37 to a series of addresses identifying read access positions in the reference image memory banks 33-0 to 33-3. Two of the reference image memory banks 33-0 to 33-3 may output data to multiplexer 35 simultaneously, in which case multiplexer 35 receives 256 bits of data at once and selects an arbitrary 128-bit segment of the received data on the basis of the address coordinates (x, y). The selected data represent the values of sixteen consecutive pixels (16×8 bits=128 bits).

Besides outputting the switching signal S37 and address coordinates (x, y), the SAD processor 37 calculates a summation of absolute differences between macroblock data received from multiplexer 34 and reference block data received from multiplexer 35, and sends the motion vector detector 38 the calculated sum (nSAD) and a vector (nMV) identifying the position of the reference block relative to the macroblock. The formula for calculating the nSAD value is:

$$n\text{SAD} = \Sum_{i,j} |C_{i,j} - R_{i,j}|$$

where $C_{i,j}$ is an eight-bit pixel value in the macroblock of current image data and $R_{i,j}$ is the corresponding eight-bit pixel value in the reference block. The smaller the nSAD value is, the more closely the current macroblock matches the reference block.

The motion vector detector 38 comprises a search processor 38a and a register (REG) file 38b.

The search processor 38a uses the vectors (nMV) and nSAD values received from the SAD processor 37 to execute an adaptive search algorithm that finds a motion vector MV for the macroblock stored in the current image memory 32-0 or 32-1 selected by multiplexer 34. The search processor 38a then writes the motion vector in the register file 38b. The search processor 38a also sends the SAD processor 37 commands from which the SAD processor 37 generates the switching signal S37 and address coordinates (x, y); the command signal line is not shown in the drawings.

The register file 38b provides space for storing motion vectors for one full horizontal row of macroblocks. For a VGA frame with 640×480 pixels, for example, there are 640/16=40 macroblocks in a full horizontal row. Each motion vector is specified by two eight-bit coordinates, that is, by two bytes of data, so the required size of the register file 38b is 40×2=80 bytes or 80×8=640 bits.

Figure 6:
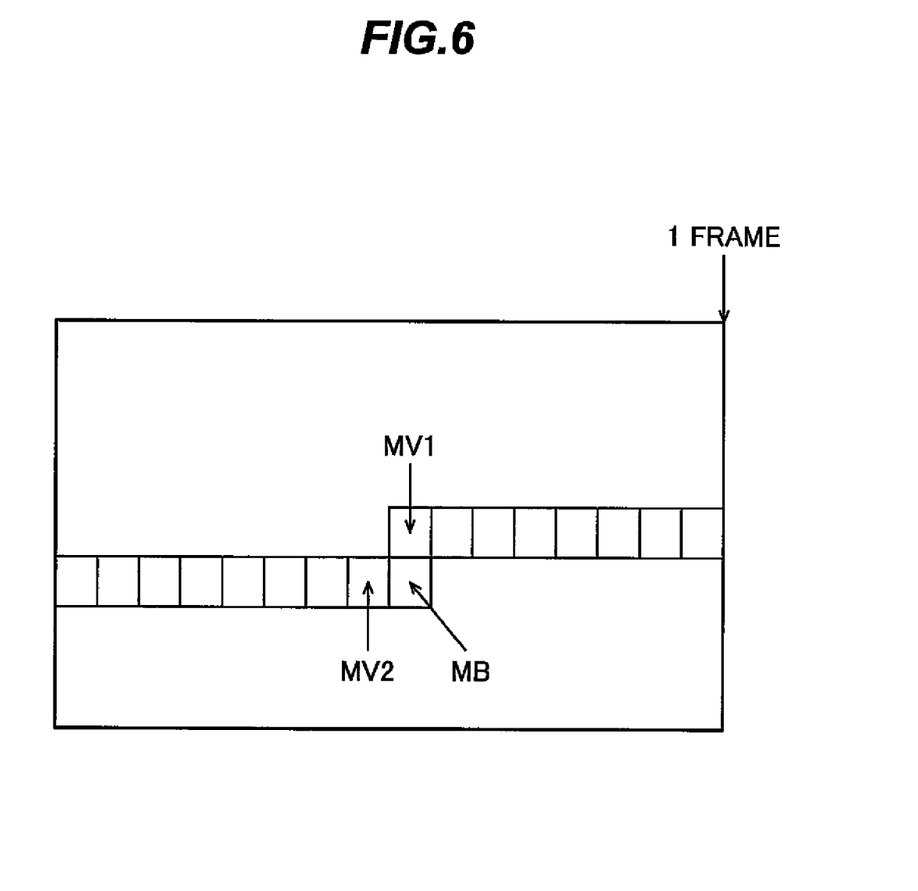
FIG. 6 schematically indicates the macroblocks for which motion vectors are stored in the register file in FIG. 5.

Each time the search processor 38a stores a newly found motion vector in the register file 38b, it overwrites the motion vector of the macroblock in the corresponding position in the previous row. The register file 38b stores the most recently found motion vectors. If the macroblocks are processed from left to right and top to bottom in the frame, then as shown in FIG. 6, at the start of the motion vector search for a typical macroblock MB, the register file 38b holds the motion vectors MV1, MV2 of the macroblocks immediately above and immediately to the left of macroblock MB and other macroblocks that were processed between these two macroblocks.

The bus control circuit 31 in the motion vector search apparatus 30 is linked by an external bus 40 to a memory controller 41, which is connected to an external memory 42 that stores the image data for at least the current frame and its preceding frame. The bus control circuit 31 is also connected to the motion vector detector 38.

The motion vector search apparatus 30 in the first embodiment differs from the conventional motion vector search apparatus 10 in FIG. 4 in that the current image memory 12 that stored one macroblock in FIG. 4 is replaced by two memory banks 32-0 and 32-1 that can collectively store two macroblocks, multiplexer 34 is added to select the data output from these memory banks 32-0 and 32-1, and the reference image memory 13 for storing nine macroblocks of reference image data is replaced by reference image memory banks 33-0 to 33-3 that can collectively store twelve macroblocks of reference image data.

The motion vector search apparatus 30 in the first embodiment carries out the motion vector search by the following processes 1 to 8.

Process 1: Under the control of the bus control circuit 31 and memory controller 41, one macroblock of image data for the current frame t is read from the external memory 42, transferred over the bus 40, and stored in current image memory bank 32-0.

Process 2: Under the control of the bus control circuit 31 and memory controller 41, nine macroblocks of image data for the preceding frame (t−1) are read from the external memory 42, transferred over the bus 40, and stored in reference image memory banks 33-0 to 33-2. The nine macroblocks include the macroblock in the same position as the macroblock read in process 1 and its eight neighboring macroblocks.

Process 3: The SAD processor 37 computes an nSAD value indicating how closely the macroblock stored in the current image memory 32-0 matches a reference block stored in the reference image memory banks 33-0 to 33-2. The reference block is located at a search point selected by a predetermined adaptive motion vector search algorithm, specified by the address coordinates (x, y). The address converter 36 converts these coordinates to a series of addresses in the reference image memory banks 33-0 to 33-2, and the multiplexer 35 supplies the data read from these addresses to the SAD processor 37. The data are read a line at a time, where a line includes sixteen pixels.

Both multiplexers 34, 35 read data simultaneously, and the SAD processor computes the nSAD value as the data are read. When sixteen lines have been read, the calculation is completed and the resulting nSAD value and the vector (nMV) identifying the position of the reference block are sent to the motion vector detector 38.

Process 4: Process 3 is executed repeatedly according to the adaptive motion vector search algorithm to compare the macroblock stored in current image memory 32-0 with different reference blocks.

Process 5: While the motion vector search in processes 3 and 4 is being carried out, the next macroblock of current image data is read into the unoccupied current image memory 32-1, and the next three macroblocks of reference image data are read into the unoccupied reference image memory 33-3.

Process 6: The motion vector detector 38 selects a motion vector MV with a (possibly local) minimum SAD value (min-SAD) and stores it in the register file 38b. The motion vector is also written in the external memory 42 via the bus control circuit 31, bus 40, and memory controller 41.

Process 7: Multiplexer 34 switches to select current image memory 32-1, and processes 3 to 6 are repeated to find a motion vector for the next macroblock of current image data, which has already been stored in current image memory 32-1, using reference image data already stored in, for example, reference image memory banks 33-1, 33-2, and 33-3. During this search, new macroblock data are read into current image memory 32-0 and, for example, reference image memory 33-0. The initial search point is determined from the motion vector found for the preceding macroblock.

Further repetitions of processes 3 to 6 then take place. During each search process, new current image data and reference image data are read from the external memory 42 into the non-selected banks (32-x, 33-x) among the current image memory banks 32-0, 32-1 and reference image memory banks 33-0 to 33-3; the transfer of image data and the motion vector search process are executed concurrently. The initial search point for each macroblock is determined from the motion vector of the macroblock immediately above or to the left, or from the motion vectors of both of these macroblocks if both motion vectors have already been found. The motion vector data are read from the register file 38b. In FIG. 6, for example, the initial search point for macroblock MB is determined from motion vectors MV1 and MV2. Since the motion of a macroblock is likely to resemble the motion of its adjacent macroblocks closely, starting from an initial search point determined in this way greatly reduces length of the search.

Process 8: Processes 3 to 7 are repeated until motion vectors have been found for every macroblock in one frame.

The first embodiment usually provides ample time to read new current image data and reference image data from the external memory 42 into the non-selected banks of the current image memories 32-0, 32-1 and reference image memories 33-0 to 33-3 during the motion vector search process, even if the bus 40 is crowded because of access by other circuits. The image data may be read by well known direct memory transfer methods.

Even if the motion vector search ends quickly, e.g., at the initial search point, at least part of the new image data can be transferred into the memory banks while the nSAD values of the adjacent search points are being calculated. The search for the next motion vector can accordingly begin more quickly than with the conventional apparatus in FIG. 4.

The motion vector search process, including the SAD calculations, is straightforward, so the motion vector search apparatus 30 need not be large in size and does not require a complex control program.

The combination of an adaptive search algorithm with the data transfer scheme of the first embodiment enables the motion vector search apparatus 30 to complete the motion vector search for an entire frame with a minimum of unnecessary delay. The time gained by transferring image data and performing block matching calculations concurrently can be used to implement improved adaptive search algorithms, resulting in improved image quality.

Second Embodiment

Figure 7:
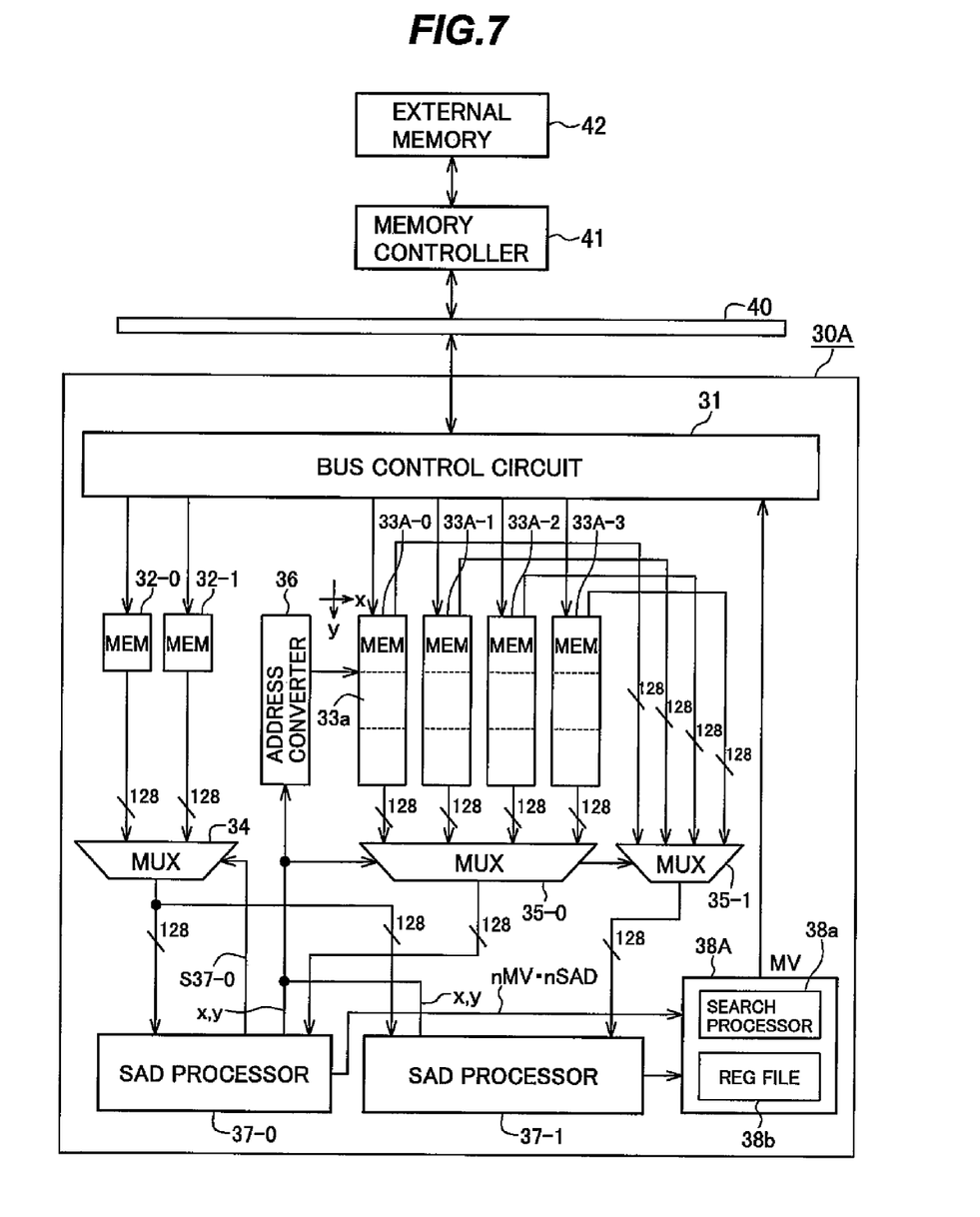
FIG. 7 is a block diagram schematically showing the structure of a motion vector search apparatus illustrating a second embodiment of the invention.

Referring to FIG. 7, the motion vector search apparatus 30A in the second embodiment has first to fourth reference image memory banks 33A-0 to 33A-3 organized as four (N) dual-port memory banks in place of the single-port memory banks used in the first embodiment, third and fourth multiplexers 35-0, 35-1 in place of the second selector in the first embodiment, a pair of SAD processors 37-0, 37-1 in place of the single SAD processor 37 in the first embodiment, and a motion vector detector 38A modified to receive data from both SAD processors 37-0, 37-1 at once.

Each of the first to fourth reference image memory banks 33A-0 to 33A-3 has one write port, first and second read ports, and storage space 33a for three (M) macroblocks of image data. A dual-port memory bank is capable of simultaneously receiving data at its write port and producing output data asynchronously from both of its read ports, each of which has a 128-bit data width. A memory bank of this type may be configured with dual-port RAM cells, as is well known.

Each of the two multiplexers 35-0 and 35-1 has four 128-bit input ports and one 128-bit output port. The input ports of multiplexer 35-0 are connected to the first read ports of the reference image memory banks 33A-0 to 33A-3; the output port of multiplexer 35-0 is connected to SAD processor 37-0.

Multiplexer 35-0 selects data received at its input ports according to address coordinates (x, y) received from SAD processor 37-0. The input ports of multiplexer 35-1 are connected to the second read ports of the reference image memory banks 33A-0 to 33A-3; the output port of multiplexer 35-1 is connected to SAD processor 37-1. Multiplexer 35-1 selects data received at its input ports according to address coordinates (x, y) received from SAD processor 37-1.

Of the two SAD processors 37-0, 37-1, SAD processor 37-0 outputs a switching signal S37-0 to multiplexer 34, outputs address coordinates (x, y) to multiplexer 35-0 and the address converter 36, receives macroblock and reference block data from multiplexers 34 and 35-0, calculates a summation of absolute differences between the two received blocks, and sends the calculated value (nSAD) and the relative position vector (nMV) of the reference block to the motion vector detector 38A. SAD processor 37-1 outputs other address coordinates (x, y) to multiplexer 35-1 and the address converter 36, receives macroblock and reference block data from multiplexers 34 and 35-1, calculates a summation of absolute differences between the two received blocks, and sends the calculated value (nSAD) and the relative position vector (nMV) of the reference block to the motion vector detector 38A.

The motion vector detector 38A comprises a search processor 38a that finds motion vectors MV according to the nSAD values (nSAD) and reference block vectors (nMV) supplied by the SAD processors 37-0 and 37-1, and a register file 38b that stores the motion vectors MV.

The search processor 38a also sends commands to the SAD processors 37-0, 37-1 from which the SAD processors 37-0, 37-1 generate the switching signal S37 and address coordinates (x, y). The address coordinates cause the two multiplexers 35-0 and 35-1 to read data for two separate reference blocks through the first and second read ports of the reference image memory banks 33A-0 to 33A-3. The two SAD processors 37-0 and 37-1 calculate summations of absolute differences for the two separate reference blocks concurrently.

In other respects, the second embodiment is the same as the first embodiment. Multiplexer 34 selects the two current image memory banks 32-0 and 32-1 alternately. While multiplexer 34 is reading macroblock data from one current image memory bank, data for the next macroblock are read from the external memory 42 into the other current image memory bank. Multiplexers 35-0 and 35-1 select data from the reference image memory banks storing macroblocks of reference data in positions identical or adjacent to the position of the macroblock being read by multiplexer 34. The search processor 38a selects an initial search point for this macroblock according to the motion vectors already found for macroblocks adjacent to it in the upward and left directions, which are stored in the register file 38b, and executes an adaptive search algorithm. The search proceeds more quickly than in the first embodiment, however, because the SAD processors 37-0 and 37-1 supply summations of absolute differences for two reference blocks at a time.

During the search for a motion vector for the macroblock read by multiplexer 34, new reference data are loaded into the non-selected reference image memory in preparation for the next search. At the end of the search, the search processor 38a stores the motion vector in the register file 38b and the external memory 42.

The second embodiment provides the same advantage as the first embodiment in enabling most motion vector searches to start immediately, the necessary data already having been read from the external memory 42 into the memory banks of the motion vector search apparatus 30A. An additional advantage of the second embodiment is faster execution of the block matching calculations.

Third Embodiment

Figure 8:
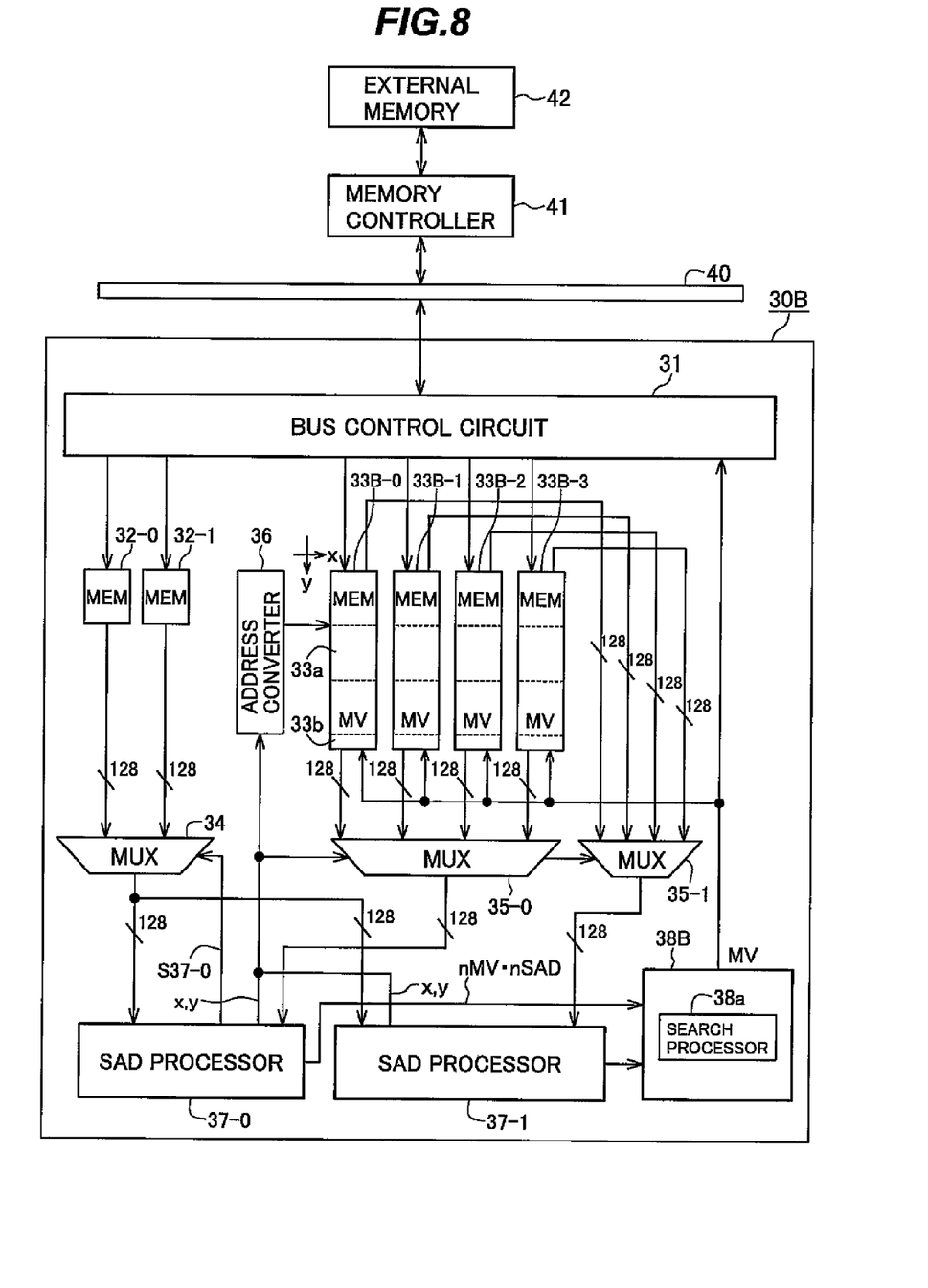
FIG. 8 is a block diagram schematically showing the structure of a motion vector search apparatus illustrating a third embodiment.

Referring to FIG. 8, the motion vector search apparatus 30B in the third embodiment has four reference image memory banks 33B-0 to 33B-3 with a dual-port configuration generally similar to the configuration in the second embodiment, but with an additional write port and additional data storage space. Each of the reference image memory banks 33B-0 to 33B-3 now has first and second write ports, first and second read ports, storage space 33a for storing three macroblocks of reference image data, and storage space 33b for storing motion vectors. All four ports may be accessed concurrently (asynchronously). Both read ports have a 128-bit data width; the write ports may have a narrower data width. The first write ports and the first and second read ports are connected to the bus control circuit 31 and the multiplexers 34, 35-0, 35-1 as in the second embodiment.

The reference image memory banks collectively provide storage space 33b for storing motion vectors for one full horizontal row of macroblocks. For a VGA frame, the requirement is 80 bytes of storage space, or 20 bytes per memory bank, a relatively modest amount in comparison with the amount of storage space 33a needed to store reference image data for three macroblocks per memory bank.

The motion vector detector 38B in the third embodiment has substantially the same search processor 38a as in the first and second embodiments, but has no register file 38b. The output data path on which the motion vector detector 38B sends motion vector data MV to the external memory 42 is also connected to the second write ports of the reference image memory banks 33B-0 to 33B-3.

The address converter 36 in the third embodiment is modified to receive information specifying addresses in the motion vector storage areas 33b from the motion vector detector 38A, as well as receiving address coordinates from the SAD processors 37-0, 37-1. The SAD processors 37-0, 37-1 are modified by providing additional means for passing motion vector data read from the reference image memory banks 33B-0 to 33B-3 directly to the motion vector detector 38A. The signal lines and other facilities associated with these modifications have been omitted to simplify the drawings.

The motion vector search apparatus 30B in the third embodiment performs the same motion vector search as in the second embodiment, but with the following differences.

To select an initial search point for a macroblock, the search processor 38a reads the motion vector or vectors already found for directly adjacent macroblocks from the reference image memory banks 33B-0 to 33B-3. The motion vector data are read through the multiplexers 35-0, 35-1 and SAD processors 37-0, 37-1.

When the search processor 38a finds a motion vector MV and sends the motion vector to the external memory 42, it also writes the motion vector in the motion vector storage area 33b in one of the reference image memory banks 33B-0 to 33B-3, using the address converter 36 to specify the write address.

In the third embodiment, the motion vector search is speeded up as in the first embodiment by reading data from the external memory 42 into the memory banks of the motion vector search apparatus 30B while the search algorithm is being executed, and as in the second embodiment by calculating summations of absolute differences for two reference blocks at once. In addition, as a register cell is typically about six times as large as a memory cell, storing the motion vectors in the reference image memory banks 33B-0 to 33B-3 instead of a register file saves space.

The present invention is not limited to the above embodiments; various modifications are possible, such as the following.

Instead of outputting an arbitrary 128-bit segment of reference image data received simultaneously from two reference image memory banks, the multiplexer or multiplexers connected to the reference image memory banks may simply select the 128 bits received from one memory bank, provided the SAD processors are configured to align the reference block data with the macroblock data.

The number of reference image memory banks is not limited to four, and the number of macroblocks stored in each reference image memory bank is not limited to three.

The reference memory banks in the second or third embodiment may be multi-port memory banks with three or more read ports, three or more multiplexers may be provided to select data from the different read ports, and three or more SAD processors may be provided to calculate summations of absolute differences for three or more reference blocks simultaneously. The additional computational power can be used to speed up the motion vector search or to implement more sophisticated adaptive search algorithms.

The invention is not limited to the use of an adaptive motion vector search algorithm.

The summation of absolute differences calculation may be replaced by another type of block matching calculation.

Those skilled in the art will recognize that still further variations are possible within the scope of the invention, which is defined in the appended claims.

What is claimed is:

1. A motion vector search apparatus for using current image data and reference image data stored in an external memory to find motion vectors for macroblocks in a moving picture, the motion vector search apparatus comprising:
   a pair of current image memories each having storage space for one macroblock of current image data read from the external memory;
   N reference image memories each having storage space for M macroblocks of reference image data read from the external memory, where M and N are integers greater than unity;
   a first selector connected to the current image memories, for selecting the current image memories alternately and reading the macroblock of current image data stored in the selected current image memory;
   a second selector connected to the reference image memories, for selecting different sets of N−1 of the reference image memories and reading different blocks of reference image data from the selected reference image memories;
   a processor connected to the first and second selectors, for performing a block matching calculation on the current image data and reference image data read by the first and second selectors and generating block matching values; and
   a detector connected to the processor, for using the block matching values to find a motion vector for the macroblock of current image data stored in the current image memory selected by the first selector.

2. The motion vector search apparatus of claim 1, further comprising a control circuit for reading a new macroblock of current image data from the external memory into the current image memory not selected by the first selector and M new macroblocks of reference image data from the external memory into the one of the reference image memories not selected by the second selector while the first and second selectors are reading current image data and reference image data from the selected current image memory and reference image memories, the processor is performing the block matching calculations, and the detector is finding the motion vector.

3. The motion vector search apparatus of claim 1, wherein the pair of current image memories and the reference image memories comprise random access memory.

4. The motion vector search apparatus of claim 3, wherein the pair of current image memories constitute two banks of random access memory.

5. The motion vector search apparatus of claim 3, wherein the reference image memories constitute N banks of random access memory.

6. The motion vector search apparatus of claim 3, wherein each one of the reference image memories comprises multi-port random-access memory with at least two read ports.

7. The motion vector search apparatus of claim 6, wherein the second selector comprises at least:
   a third selector connected to one of the read ports of each one of the reference image memories; and
   a fourth selector connected to another one of the read ports of each one of the reference image memories.

8. The motion vector search apparatus of claim 7, wherein the third and fourth selectors operate simultaneously to read reference image data from the selected N−1 reference image memories.

9. The motion vector search apparatus of claim 7, wherein the processor comprises:
   a first processing unit connected to the first and third selectors, for performing the block matching calculation on the current image data and reference image data read by the first and third selectors; and
   a second processing unit connected to the first and fourth selectors, for performing the block matching calculation on the current image data and reference image data read by the first and fourth selectors.

10. The motion vector search apparatus of claim 1, wherein at least one of the reference image memories also has storage space for motion vectors and has two write ports, one of the write ports being connected to the detector to receive the motion vectors found by the detector.

11. The motion vector search apparatus of claim 10, wherein the detector writes each motion vector that it finds into both the external memory and the at least one of the reference image memories.

12. The motion vector search apparatus of claim 1, wherein the detector includes a register file for storing motion vectors found by the detector.

13. The motion vector search apparatus of claim 12, wherein the register file has space for storing motion vectors for one full row of macroblocks in the moving picture.

14. The motion vector search apparatus of claim 13, wherein the register file stores the motion vectors most recently found by the detector.

15. The motion vector search apparatus of claim 1, wherein M is equal to three and N is equal to four.

16. The motion vector search apparatus of claim 1, wherein a macroblock is a 16×16 array of picture elements.

17. The motion vector search apparatus of claim 1, wherein the detector executes an adaptive motion vector search algorithm.

18. The motion vector search apparatus of claim 1, wherein the block matching calculation is a summation of absolute differences.

* * * * *